(12) United States Patent
Song et al.

(10) Patent No.: US 9,160,924 B2
(45) Date of Patent: Oct. 13, 2015

(54) DIGITAL PHOTOGRAPHING APPARATUS AND METHOD OF CONTROLLING THE DIGITAL PHOTOGRAPHING APPARATUS

(75) Inventors: Won-seok Song, Seoul (KR); Tae-hoon Kang, Seoul (KR); Jong-sun Kim, Suwon-si (KR); Myung-kyu Choi, Suwon-si (KR); Kwang-il Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 13/595,117

(22) Filed: Aug. 27, 2012

(65) Prior Publication Data

US 2013/0162876 A1 Jun. 27, 2013

(30) Foreign Application Priority Data

Dec. 21, 2011 (KR) ........................ 10-2011-0139217

(51) Int. Cl.
  *H04N 5/222* (2006.01)
  *H04N 5/228* (2006.01)
  *H04N 5/232* (2006.01)
  *H04N 5/272* (2006.01)

(52) U.S. Cl.
  CPC ....... *H04N 5/23229* (2013.01); *H04N 5/23293* (2013.01); *H04N 5/272* (2013.01)

(58) Field of Classification Search
  CPC H04N 5/23229; H04N 5/23293; H04N 5/272
  USPC ....................... 348/222.1, 333.1, 324, 333.01
  See application file for complete search history.

(56) References Cited

U.S. PATENT DOCUMENTS

| | | | |
|---|---|---|---|
| 6,621,524 B1 | 9/2003 | Iijima et al. | |
| 7,053,915 B1 * | 5/2006 | Jung et al. | ..................... 345/633 |
| 2005/0281536 A1 * | 12/2005 | Aiso et al. | ........................ 386/69 |
| 2009/0021600 A1 * | 1/2009 | Watanabe | .................. 348/222.1 |
| 2010/0141784 A1 * | 6/2010 | Yoo | ............................ 348/222.1 |

* cited by examiner

*Primary Examiner* — Trung Diep
(74) *Attorney, Agent, or Firm* — Drinker Biddle & Reath LLP

(57) ABSTRACT

A digital photographing apparatus, computer readable medium, and a method of controlling the digital photographing apparatus, the method including selecting a template image; receiving an image including a subject and detecting the subject from the received image; and displaying the template image with an image of the subject included in a view area. The displaying may include displaying the template image with an image of the subject included in a view area corresponding to a location of the detected subject. The method may include designating a location of the view area on the template image.

22 Claims, 11 Drawing Sheets

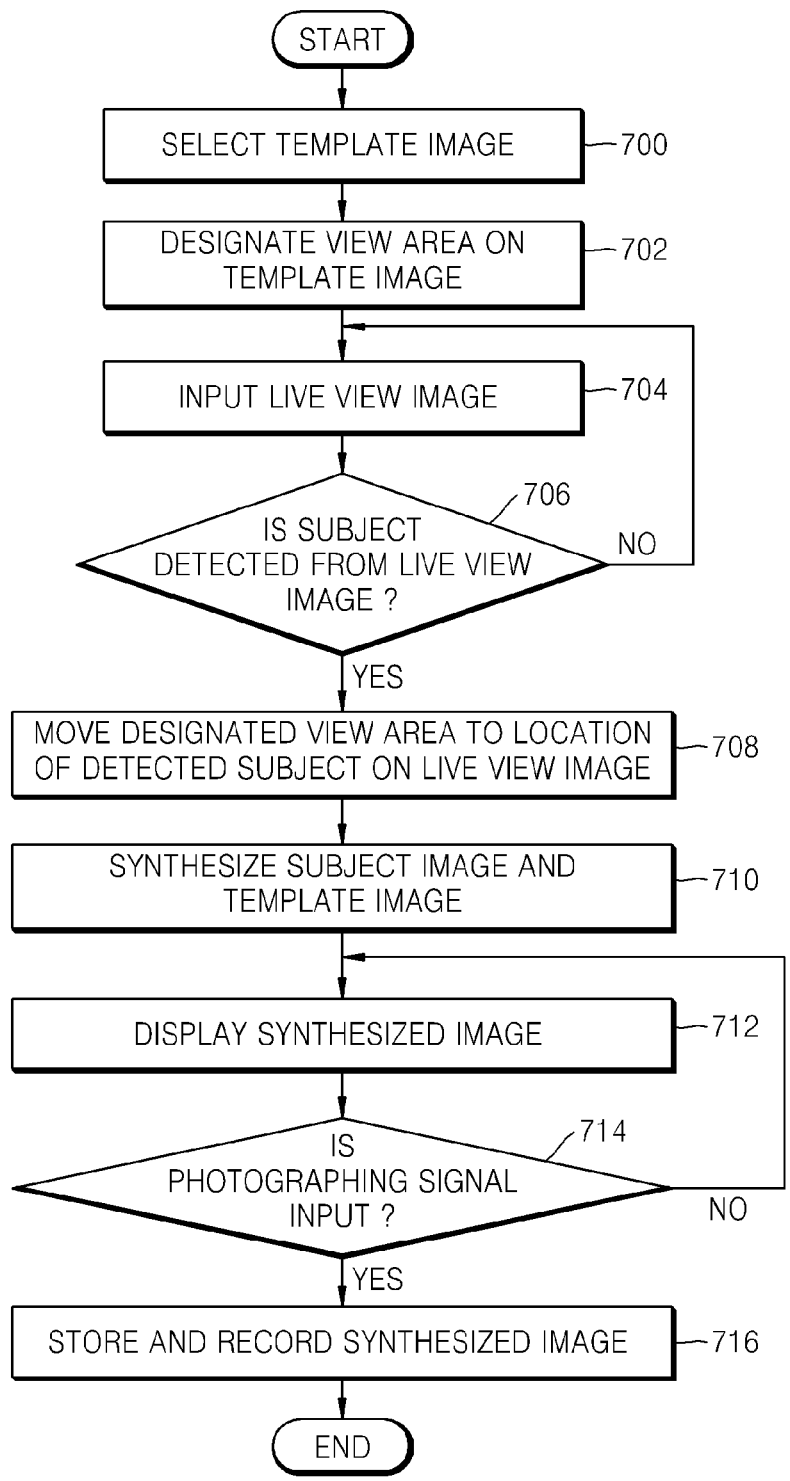

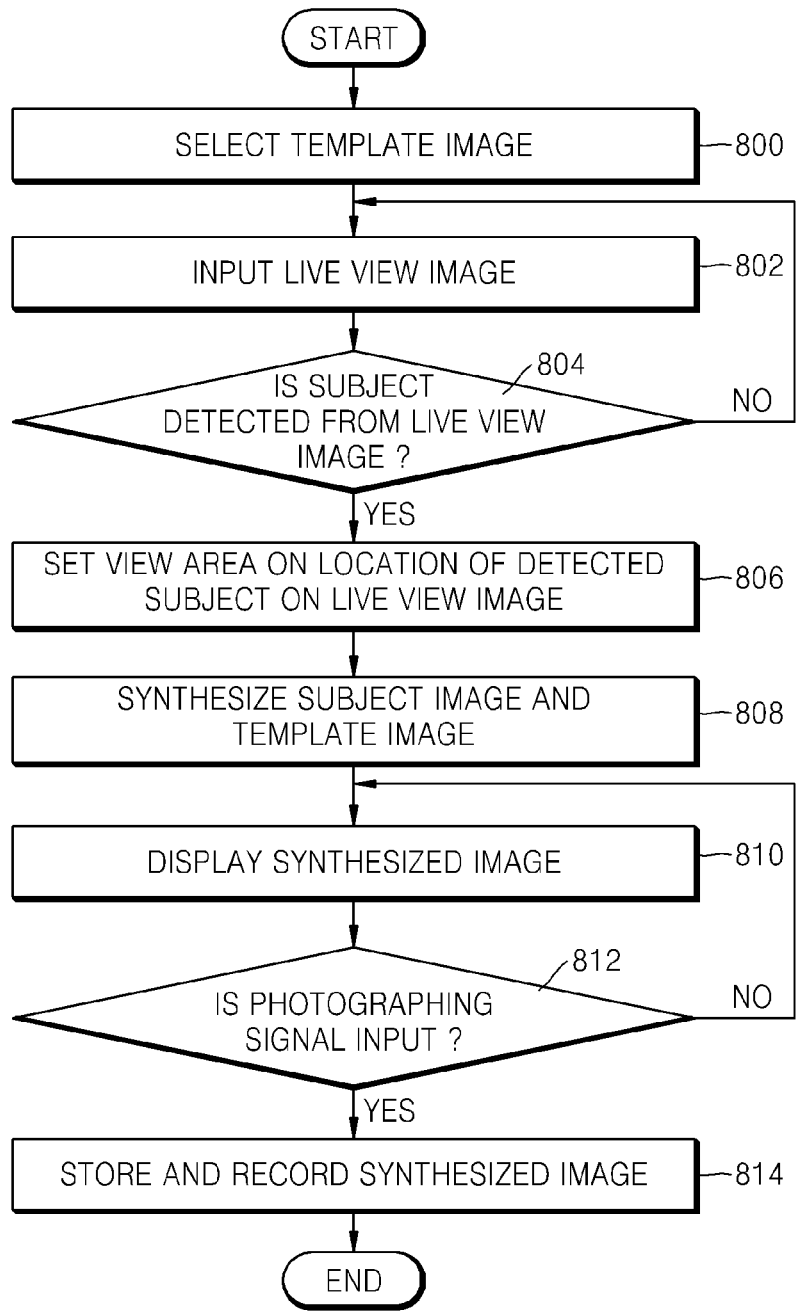

DIGITAL PHOTOGRAPHING APPARATUS AND METHOD OF CONTROLLING THE DIGITAL PHOTOGRAPHING APPARATUS

CROSS-REFERENCE TO RELATED PATENT APPLICATION

This application claims the benefit of Korean Patent Application No. 10-2011-0139217, filed on Dec. 21, 2011, in the Korean Intellectual Property Office, the entire disclosure of which is incorporated herein by reference.

BACKGROUND

1. Field of the Invention

The invention relates to a digital photographing apparatus, computer readable medium, and a method of controlling the digital photographing apparatus for synthesizing a view area of a captured image with a background or template image.

2. Description of the Related Art

Some photographing apparatuses provide a technique of synthesizing a face image of a person from a live view image with a background image so that in the synthesized image it looks as if the person and the background image were photographed together.

However, often the operation of synthesizing the face image and the background image can be awkward because the photographing apparatus needs to be moved or the background image needs to be moved in order to obtain a composition desired by a user of the photographing apparatus.

SUMMARY

Therefore, there is a need in the art for a digital photographing apparatus and method of controlling a digital photographing apparatus, the method including selecting a template image; receiving an image including a subject and detecting the subject from the received image; and displaying the template image with an image of the subject included in a view area corresponding to a location of the detected subject.

The displaying may include displaying the template image with an image of the subject included in a view area corresponding to a location of the detected subject.

The method may further comprise designating the view area on the template image.

The view area may be designated on the template image, and the designated view area may be movable according to a movement of the detected subject.

The view area may be set on the location of the detected subject.

The method may further comprise setting a view area corresponding to the location of the detected subject; generating a mask template image by removing the view image from the input image; and storing the mask template image.

The generating of the mask template image may further comprise blurring a boundary of the view area.

The storing of the mask template image may comprise storing information about a starting coordinate of a minimum rectangle surrounding the view area and information about a size of the minimum rectangle.

The displaying may comprise displaying a synthesized image obtained by synthesizing the stored mask template image and the template image.

The digital photographing apparatus may comprise a front display screen or a flipped display screen.

When a shutter release signal is received, the method may further comprise capturing the input image and synthesizing the captured input image with the template image.

The subject may comprise a face area of a person.

The template image may be a background image.

The input image may be a live view image.

According to another aspect of the invention, there is provided a method of controlling a digital photographing apparatus, the method comprising: selecting a template image; receiving an image including a subject and detecting the subject from the received image; capturing the input image comprising a view area corresponding to a location of the detected subject; and synthesizing the template image with the captured input image.

The view area may be movable on the template image according to a movement of the subject.

The method may further comprise designating the view area on the template image, and the designated view area may be movable according to a movement of the subject.

The method may further comprise setting the view area onto the location of the detected subject, wherein the set view area is movable according to a movement of the subject.

According to another aspect of the invention, there is provided a digital photographing apparatus comprising: a subject detection unit which receives an image comprising a subject and detects the subject from the received image; and a controller which receives a template image and displays an image of the subject included in a view area corresponding to a location of the detected subject, and the template image.

The controller may comprise a view area moving unit which moves the view area designated on the template image according to a movement of the detected subject.

The controller may further comprise a view area matching unit which sets the view area onto the location of the detected subject.

The controller may further comprise an image synthesis unit which synthesizes the image of the subject included in the view area corresponding to the location of the detected subject with the template image.

The controller may further comprise an area effect-giving unit that blurs a boundary of the view area.

The digital photographing apparatus may further comprise a front display screen or a flipped display screen capable of displaying the image of the subject and the template image so that the image of the subject and the template image face the subject.

A computer readable medium is provided. The computer readable medium storing a program for causing a computer to perform operations including the steps of selecting a template image; receiving an image including a subject and detecting the subject from the received image; and displaying the template image with an image of the subject included in a view area corresponding to a location of the detected subject.

BRIEF DESCRIPTION OF THE DRAWINGS

The above and other features and advantages of the invention will become more apparent by describing in detail exemplary embodiments thereof with reference to the attached drawings in which:

FIG. 7 is a flowchart of an example method of controlling a digital photographing apparatus, according to another embodiment of the invention; and FIG. 8 is a flowchart of an example method of controlling a digital photographing apparatus, according to another embodiment of the invention.

DETAILED DESCRIPTION

Figure 1:
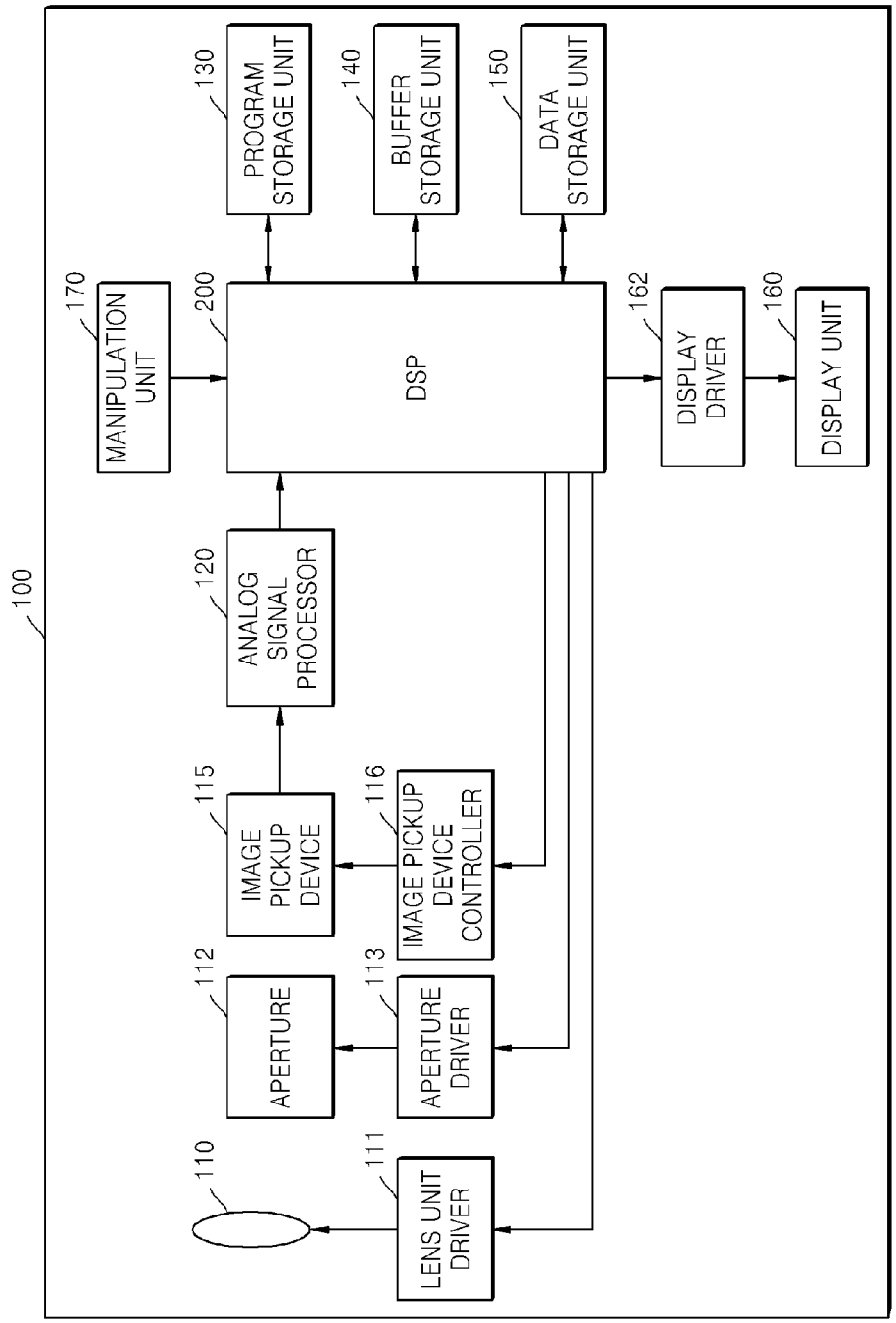
FIG. 1 is an illustration of a schematic block diagram showing a digital camera as an example of a digital photographing apparatus, according to an embodiment of the invention.

The invention will be described more fully with reference to the accompanying drawings, in which example embodiments of the invention are shown. This invention should not be construed as limited to the example embodiments set forth herein. Commonly-used technologies or structures related to the invention may be omitted to make it easier to explain the invention.

Hereinafter, the invention will be described in detail by explaining example embodiments of the invention with reference to the attached drawings. Like reference numerals in the drawings denote like elements.

FIG. 1 is a schematic block diagram showing a digital camera 100 as an example of a digital photographing apparatus, according to an embodiment of the invention.

The digital camera 100 will now be described as an example of a digital photographing apparatus according to an embodiment of the invention. However, the digital photographing apparatus is not limited to the digital camera 100 of FIG. 1 and may be any of other portable apparatuses such as a camera phone, a personal digital assistant (PDA), a portable multimedia player (PMP), or a camcorder.

Referring to FIG. 1, the digital camera 100 may include a lens unit 110, a lens unit driver 111, an aperture 112, an aperture driver 113, an image pickup device 115, an image pickup device controller 116, an analog signal processor 120, a program storage unit 130, a buffer storage unit 140, a data storage unit 150, a display driver 162, a display unit 160, a digital signal processor (DSP) 200, and a manipulation unit 170. The lens unit 110, the lens unit driver 111, the aperture 112, the aperture driver 113, the image pickup device 115, the image pickup device controller 116, and the analog signal processor 120 may be referred to as a photographing unit.

The lens unit 110 focuses an optical signal. The lens unit 110 includes, for example, a zoom lens for controlling a viewing angle to be increased or decreased according to a focal length and a focus lens for adjusting a focus of a subject. The zoom lens and the focus lens each may be formed of a single lens or a group of lenses. The aperture 112 adjusts an amount of incident light according to a degree of opening thereof.

The lens unit driver 111 and the aperture driver 113 receive a control signal from the DSP 200 and drive the lens unit 110 and the aperture 112, respectively. The lens unit driver 111 adjusts the focal length by controlling a position of a lens to perform operations of auto-focusing, zoom change, and focus change. The aperture driver 113 adjusts the degree of opening of the aperture 112, in particular, adjusts an f number or a value of the aperture 112 to perform operations of auto-focusing, auto-exposure correction, focus change, and adjustment of depth of field.

An optical signal transmitted through the lens 110 forms an image of a subject on a light-receiving side of the image pickup device 115. The image pickup device 115 may be a Charge-Coupled Device (CCD) image sensor or a Complementary Metal-Oxide Semiconductor Image Sensor (CIS) that converts an optical signal to an electrical signal. The image pickup device controller 116 may control the sensitivity or the like of the image pickup device 115. The image pickup device controller 116 may control the image pickup device 115 according to a control signal automatically generated by a real-time input image signal or a control signal manually input by a user via the manipulation unit 170. A shutter (not shown) controls a light-exposure time of the image pickup device 115. The shutter includes a mechanical shutter for adjusting incidence of light by moving a screen and an electronic shutter for controlling exposure by applying an electric signal to the image pickup device 115.

The analog signal processor 120 performs noise reduction, gain adjustment, waveform standardization, analog-to-digital conversion (ADC), etc. on an analog signal generated and provided from the image pickup device 115.

Through the manipulation unit 170, a control signal may be input from the outside such as the user. The manipulation unit 170 may include various functional buttons, such as a shutter-release button for inputting a shutter-release signal to take a picture by exposing the image pickup device 115 to light for a predetermined period of time, a power button for inputting a control signal to control power ON/OFF, a wide-angle zoom button and a telephoto zoom button for widening and narrowing a viewing angle, respectively, according to a user's input, a mode selection button, and various other function buttons such as a button for mode selection from among a character input or photographing mode, a display mode, etc., a button for a white balance setting function, and a button for selection of an exposure setting function. The manipulation unit 170 may be implemented by any means enabling a user to input a control signal, for example, by a button, a keyboard, a touch pad, a touch screen, and a remote controller.

According to the current embodiment, a user selects a template image or a background image through the manipulation unit 170. For example, in a synthesis image photographing mode, first, template images corresponding to backgrounds are searched for in the data storage unit 150 or an outside memory, and a specific template image is selected from the found template images. The user designates a view area on a screen on which the specific template image is displayed, through the manipulation unit 170. The view area denotes an area where a subject or panorama image is to be located. When the manipulation unit 170 is a touch pad or a touch screen, the user may designate the view area by freely manipulating a touch area. When the manipulation unit 170 is not a touch pad or a touch screen, the manipulation unit 170 may provide a frame for designation of a view area, and the frame may have any shape.

The digital camera 100 includes the program storage unit 130 for storing a program such as an operating system for driving the digital camera 100 or an application system, the buffer storage unit 140 for temporarily storing data for performing an operation or resultant data, and the data storage unit 150 for storing various pieces of information needed for the program, as well as an image file having an image signal. According to the current embodiment, the template image selected by the user is stored in the buffer storage unit 140 or the data storage unit 150, and the view area designated on the template image by the user and a mask template image obtained by removing the view area from an input image are stored in the buffer storage unit 140 or the data storage unit 150. When the DSP 200 performs image synthesis or synthesizes a captured image to display a live view image, the DSP 200 retrieves images stored in the buffer storage unit 140 or the data storage unit 150.

The digital camera 100 includes the display unit 160 for displaying an operation state of the digital camera 100 or data about a still image or a moving picture captured by the digital camera 100. The display unit 160 may provide visual information and/or auditory information to the user. To provide the visual information, the display unit 160 may include, for example, a Liquid Crystal Display (LCD), or an Organic Light-Emitting Display (OLED). The display driver 162 generates and provides a driving signal to the display unit 160. According to the present embodiment, the display unit 160 may be disposed on a rear surface of the digital camera 100, namely, on a surface thereof where manipulation panels are installed. For example, the display unit 160 may be disposed on a front surface of the digital camera 100 so as to face a subject, or may be disposed on a rear surface thereof but may be flipped upwards from the rear surface to face the subject. The display unit 160 may be implemented using two LCDs on the rear surface and the front surface of the digital camera 100, respectively.

The DSP 200 processes an input image signal and controls corresponding components of the digital camera 100 according to the processed image signal or an input signal from the outside. The DSP 200 may reduce noise of input image data and perform image signal processing for image quality improvement such as gamma correction, color filter array interpolation, color matrix, color correction, and color enhancement. In addition, the DSP 200 may generate an image file by compressing image data obtained by the image signal processing for image quality improvement or restore the image data from the image file. A compression format of an image may be a reversible format or an irreversible format. Compressed data may be stored in the data storage unit 150. The DSP 200 may also perform obscurity processing, color processing, blur processing, edge emphasis processing, image analysis processing, image recognition processing, image effect processing, etc. Face recognition, scene recognition, or the like may be performed as the image recognition processing. For example, brightness level adjustment, color correction, contrast adjustment, contour emphasis adjustment, screen division, creation of a character image, and the like, and image synthesis may be performed.

In addition, the DSP 200 may generate control signals for controlling, for example, Auto Focusing (AF), a zoom change, a focus change, and Auto Exposure (AE) correction, by executing programs stored in the program storage unit 150 or by using a separate module, may provide the control signals to the lens unit driver 111, the aperture driver 113, and the image pickup device controller 116, and may generally control operations of components of the digital camera 100, such as a shutter and a flash.

According to the current embodiment, the DSP 200 receives an image including a subject and detects the subject from the input image. When a template image is input, the DSP 200 synthesizes a subject image included in a view area corresponding to the location of the detected subject with the template image and displays a result of the synthesis. When the user designates the view area from a displayed template image through the manipulation unit 170, the DSP 200 moves the designated view area according to a movement of the detected subject. For example, the view area designated on the template image is fixed, but the fixed view area is moved to the location of a detected subject according to a location of a subject on an image input for photographing, namely, a live view image. When the user does not designate a view area, the DSP 200 sets the view area onto the location of the subject detected from the input image. A detailed structure of the DSP 200 will now be described with reference to FIG. 2.

Figure 2:
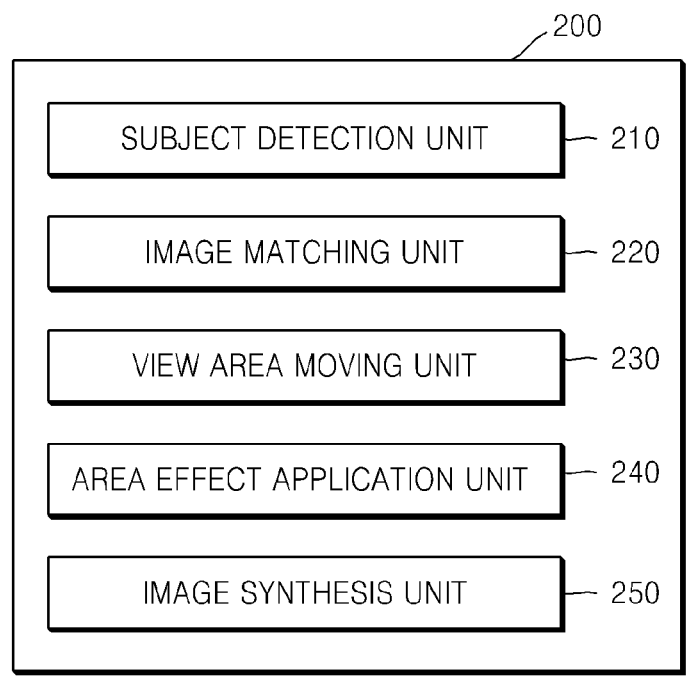
FIG. 2 is a schematic block diagram illustrating an example of a digital signal processor included in the digital camera shown in FIG. 1.

FIG. 2 is a schematic block diagram showing the DSP 200 shown in FIG. 1.

Referring to FIG. 2, the DSP 200 includes a subject detection unit 210, a view area matching unit 220, a view area moving unit 230, an area effect application unit 240, and an image synthesis unit 250. In embodiments, the digital photographing apparatus or a controller may be referenced when referring to the DSP 200.

The subject detection unit 210 detects a subject from an image input via the image pickup device 115. The subject may be a face area of a person. Although hereinafter the subject is assumed to be a face and the description focuses on face detection, other subjects may also be detected through the same learning method.

The subject detection unit 210 detects a predetermined face area from the input image. When the face area is detected, a face detection frame is displayed on the face area. In general, in face detection, whether face data exists in input image data is determined by comparing pre-stored face feature data with the input image data, and, when it is determined that the face data exists, a location of the face data on the input image data is recognized. There are many face region detection techniques or algorithms, which may be used in face detection according to an embodiment of the invention. For example, the face may be detected by using a motion vector technique, a feature point detection technique, an Adaboost learning technique, or the like.

The view area matching unit 220 sets the view area onto the location of the detected subject. In an embodiment, when a user does not designate the view area, namely, an area where a subject or panorama image to be synthesized with a template image or a background image is to be located, the view area matching unit 220 automatically sets the view area onto the location of the subject detected from the input image. Taking face detection as an example, the view area is set via the location of a rectangular face detection frame, namely, via the coordinate of an initial beginning pixel of the face detection frame and the numbers of pixels on the width and the length of the face detection frame.

The view area moving unit 230 moves the designated view area to the detected face area, when the view area, namely, the area where a subject or panorama image to be synthesized with a template image is to be located, is manually designated by a user and the designated view area, namely, the location of the subject detected from the input image, is different from the detected face area. In addition, when the face area moves, the view area moving unit 230 moves the view area together with the moving face area.

FIGS. 3A-3E are views for explaining designation of a view area on a template image and movement of the designated view area, according to another embodiment of the invention.

Figure 3A:
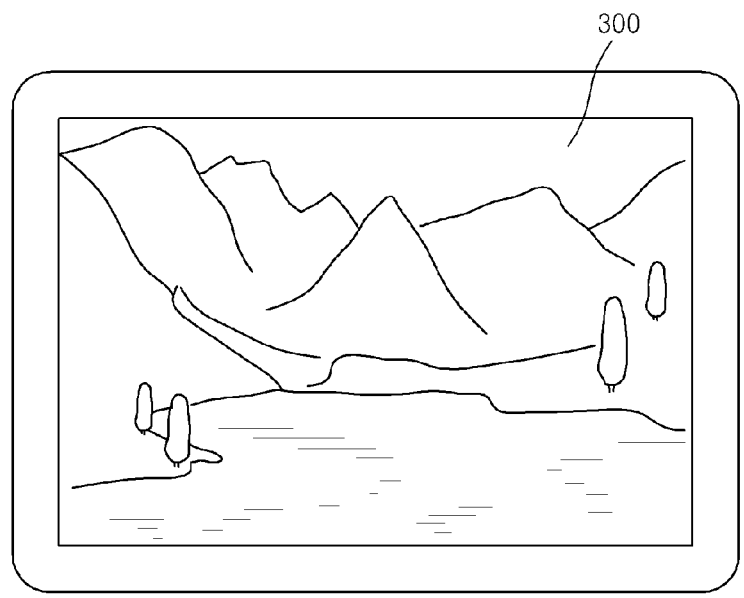
FIGS. 3A-3E are example views for explaining designation of a view area on a template image and movement of the designated view area, according to another embodiment of the invention.

Referring to FIG. 3A, a template image 300 is displayed. The template image is a background image, and may be an image stored in the digital camera 100 or a previously captured image.

Figure 3B:
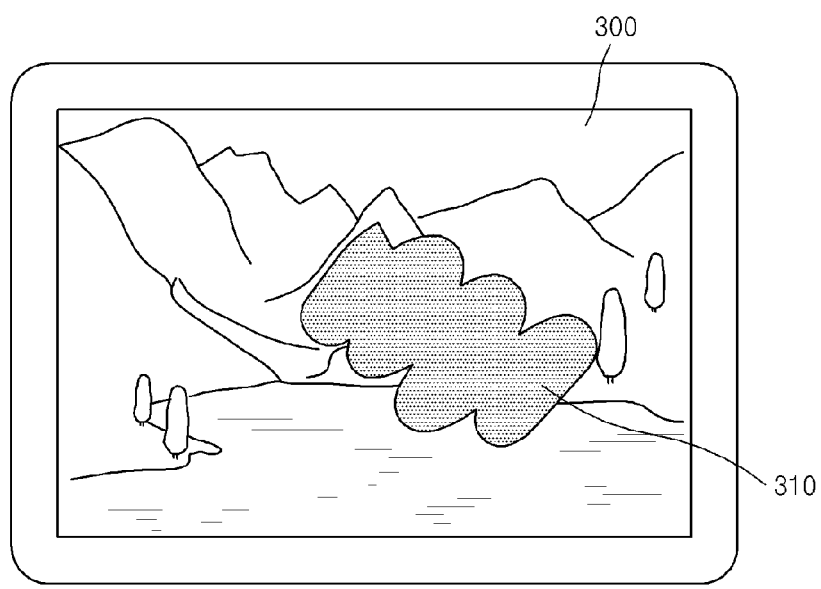

Referring to FIG. 3B, a view area 310 is designated on the displayed template image 300. The view area 310 may be designated by a user to have any size or shape. The view area 310 is designated by the user touching a touch panel of the display unit 160, but the designation manner is not limited thereto.

Figure 3C:
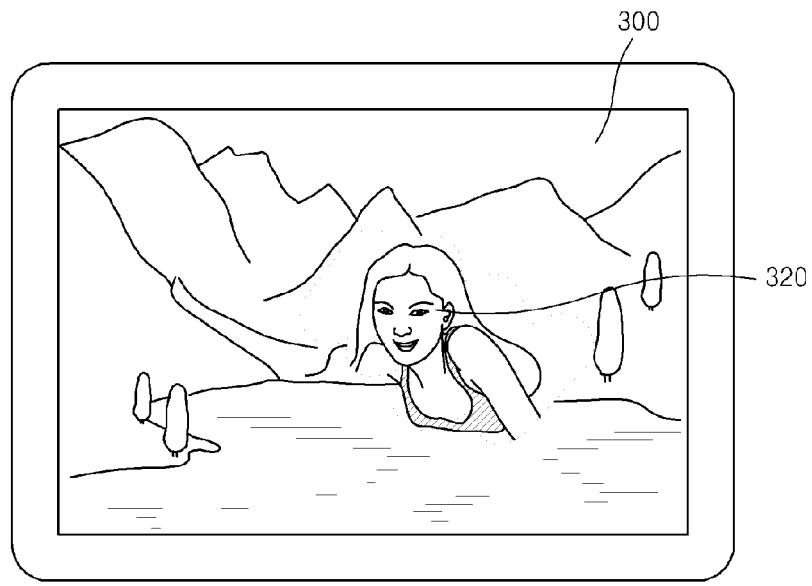

Referring to FIG. 3C, a subject image 320 detected from an input image is displayed on the view area 310 designated on the template image 300. Although the background on the input image or a live view image is different from the template image 300, a remaining portion of the input image or the live view image excluding the subject image 320 is entirely masked, and the subject image 320 and the template image 300 are synthesized and displayed.

Figure 3D:
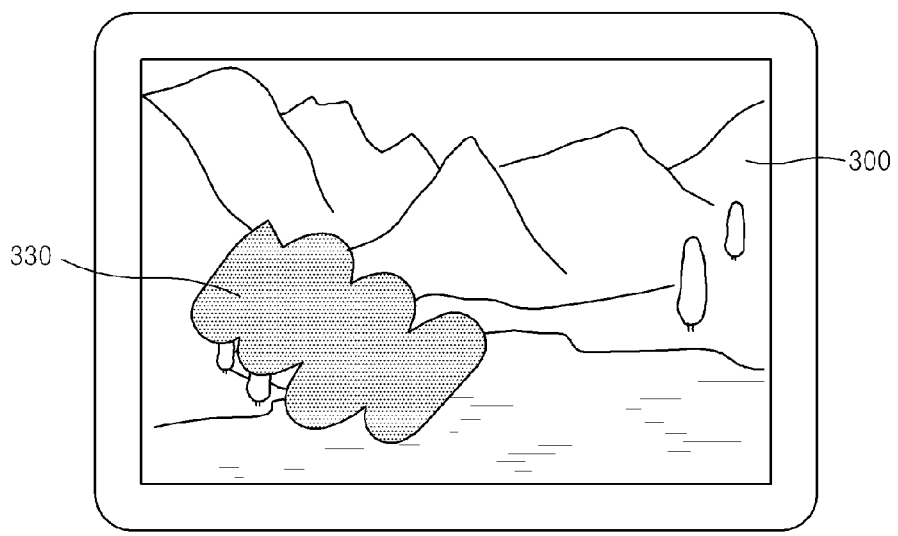

Referring to FIG. 3D, a case where a view area 330 is designated on a location on the template image 300 that is different from the location where the view area 310 is designated in FIG. 3B is illustrated. The view area 330 may be arbitrarily designated by a user.

Figure 3E:
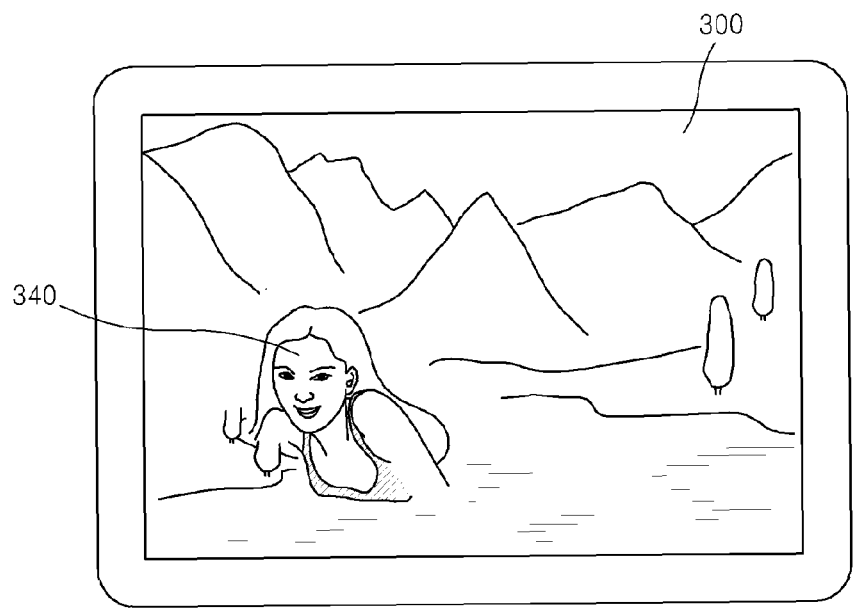

Referring to FIG. 3E, a subject image 340 detected from an input image is displayed on the view area 330 shown in FIG. 3D. In embodiments, no matter what area on the input image the subject images 320 and 340 of FIGS. 3C and 3E are located, the subject images 320 and 340 are synthesized with the view area 330 designated on the template image 300 and displayed when synthesis photographing is performed.

Referring back to FIG. 2, the area effect-giving unit 240 blurs a boundary of a view area. The area effect-giving unit 240 performs blurring on the boundary, that is, the edge, of a view area designated by the user, set on the location of the detected subject, or moved according to a motion of the subject. In embodiments, the blurring with respect to the boundary of the view area is optional.

FIGS. 4A-4E are views for explaining application of an effect to a view area and storage of a result of the effect application, according to another embodiment of the invention.

Figure 4A:
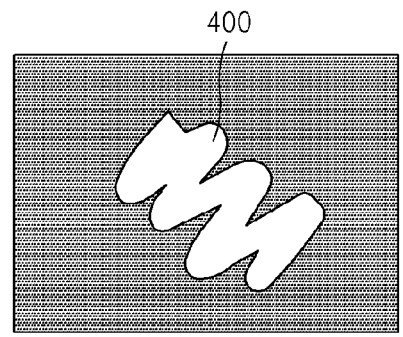
FIGS. 4A-4E are example views for explaining application of an effect to a view area and storage of a result of the effect application, according to another embodiment of the invention.

When the view area is designated, the DSP 200 generates a mask template image including an image 400 corresponding to a view area, as illustrated in FIG. 4A. In this case, to obtain a natural movement effect between a selected image, namely, the view area image 400, and a remaining image area, an edge of an area where the movement occurs is blurred, as illustrated in FIG. 4B.

Figure 4B:
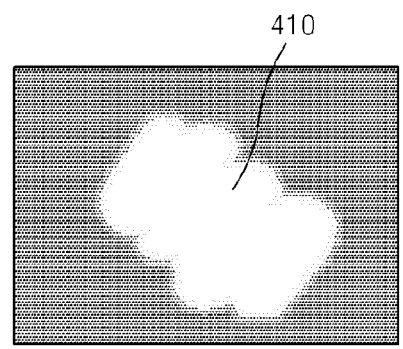

Referring to FIG. 4B, a background pixel in the mask template image has a brightness value of 0, and the area of the selected image therein has a brightness value of 255. Toward the outside of the movement area, a brightness value, which is stored, gradually decreases so that, when synthesis is performed on the movement area, alpha blending happens through these stored values. For example, a black portion in the mask template image is not synthesized, and only a portion having a pixel value is synthesized with the template image when the area has a brightness value of 255.

Figure 4C:
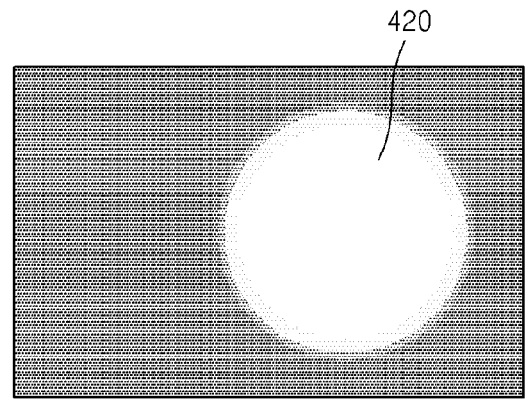
Figure 4D:
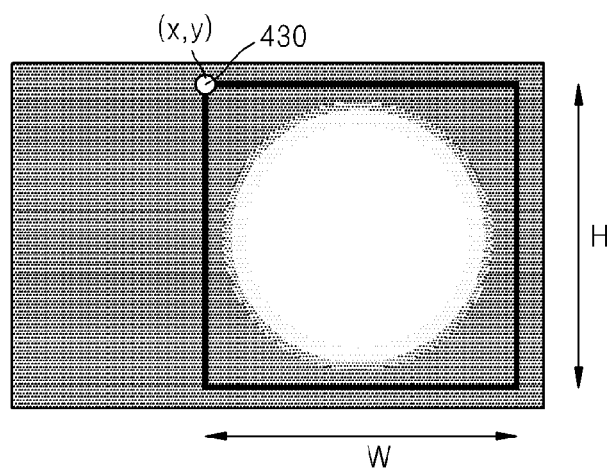
Figure 4E:
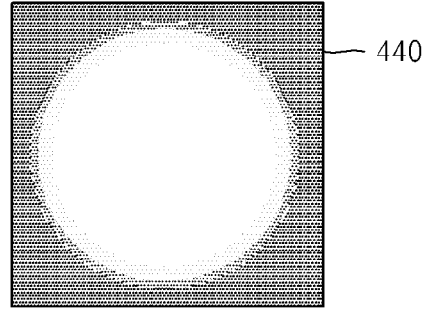

Referring to FIG. 4C, a mask template image having a view area 420 designated as a circle with a blurred edge is illustrated. Referring to FIG. 4D, to synthesize a subject image located on the view area 420 of FIG. 4C with a template image, a start coordinate 430 of a minimum rectangle surrounding the view area 420 and the size, namely, a width W and a height H, of the minimum rectangle are stored in the buffer storage unit 140 or the data storage unit 150, when a mask template image is stored. The stored mask template image corresponds to a mask template image 440 illustrated in FIG. 4E.

Referring back to FIG. 2, the image synthesis unit 250 synthesizes the subject image included in the view area corresponding to the location of the detected subject with the template image. In an embodiment, the image synthesis unit 250 synthesizes a subject image of an input image located on the stored mask template image 440 of FIG. 4E with the template image. The DSP 200 outputs a synthesized image obtained by the image synthesis unit 250 to the display unit 160. In addition, the DSP 200 stores in the data storage unit 150 or a memory card (not shown) the synthesized image according to a shutter release signal for photographing, after the synthesized image is displayed.

Figure 5:
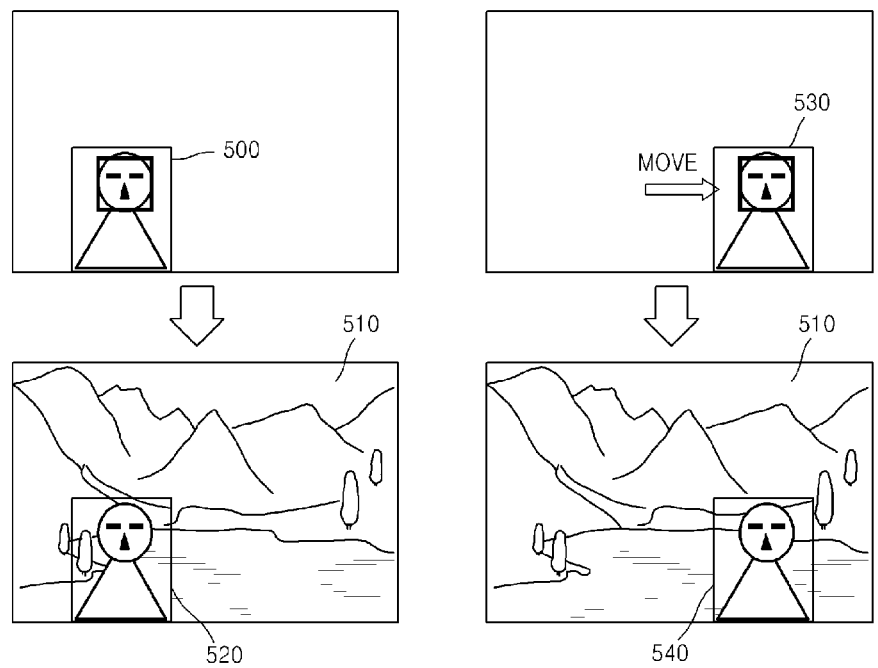
FIG. 5 is an example view for explaining an operation in which a designated view area moves according to a movement of a subject, according to another embodiment of the invention.

FIG. 5 is a view for explaining an operation in which a designated view area moves according to a movement of a subject, according to another embodiment of the invention.

Referring to FIG. 5, a subject image 520 located on a designated view area 500, and a template image 510 are displayed. When a subject is moved, the view image 500 is moved to become a view area 530 according to subject detection, and a subject image 540 located on the moved view area 530 and the template image 510 are displayed.

FIGS. 6A-6D are views for explaining an operation of setting a view area according to a subject detection location, according to another embodiment of the invention.

Figure 6A:
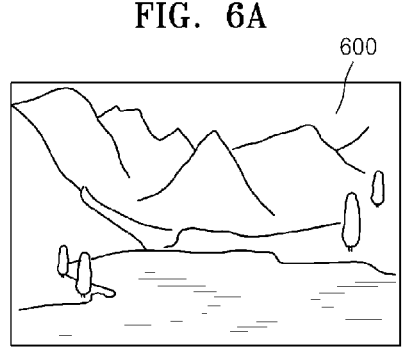
FIGS. 6A-6D are example views for explaining an operation of setting a view area according to a subject detection location, according to another embodiment of the invention.
Figure 6B:
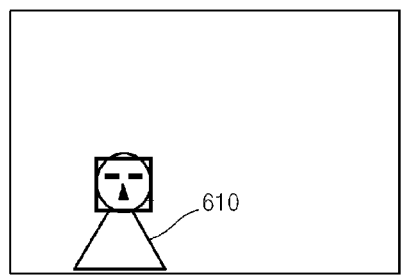
Figure 6C:
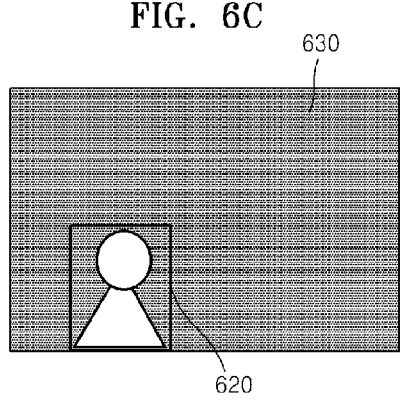

Referring to FIG. 6A, a template image 600 is selected. Referring to FIG. 6B, a subject area 610 is detected from an input image. Referring to FIG. 6C, a view area 620 is set on a location corresponding to the subject area 610, and a mask template image is generated by masking a remaining area 630 excluding the view area 620.

Figure 6D:
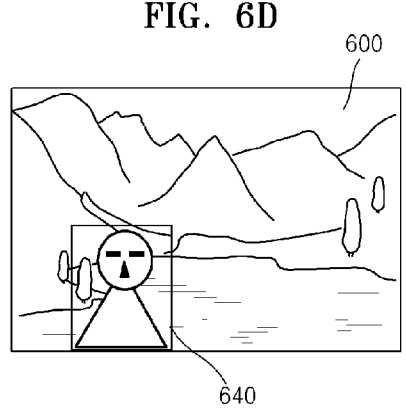

Referring to FIG. 6D, a subject image 640 located on the view area 620 of the mask template image, and the template image 600 are synthesized and displayed.

FIG. 7 is a flowchart of an example method of controlling a digital photographing apparatus, according to an embodiment of the invention.

Referring to FIG. 7, in operation 700, a template image is selected by a user. Although the template image is selected manually by the user in the current embodiment, the embodiment is not limited thereto, and a template image may be automatically provided as a background image of a subject which is to be photographed. In operation 702, a view area is designated on the template image. The template image denotes an image corresponding to the background in a synthesized image, and the view area denotes an area on the synthesized image where an image corresponding to a subject or a panorama is to be located. The view area may be designated arbitrarily by the user to have any size or shape, and may be designated using a touch dragging method or any other method. In embodiments, step 702 may come before step 700.

In operation 704, a live view image is input. After the template image and the view area are determined in operations 700 and 702, a live view image or a preview image is input to the DSP 200. In embodiments, step 704 may come prior to step 702 or step 700.

In operation 706, the DSP 200 detects a subject from the live view image. If a subject is not detected, the method goes back to operation 704. For example, a face area is detected from the live view image.

In operation 708, the DSP 200 moves the designated view area to the location of the detected subject on the live view image, namely, to an area on the live view image where the subject is located. When the location of the detected subject is different from the designated view area, the designated view area is moved to the location of the detected subject. In other words, the view area is not fixed but may be moved according to a location of the subject on the live view image.

In operation 710, the DSP 200 synthesizes a subject image and the template image. In other words, an image of the subject located on the view area is synthesized with the template image selected in operation 700. A mask template image is generated by masking an area excluding the view area, and the mask template image is synthesized with the template image. In this process, image processing, for example, blurring, is performed on an edge of the view area, and thus, the edge of the view area or a portion of the view area where movement occurs may be displayed naturally.

In operation 712, the DSP 200 produces and displays a synthesized image. Accordingly, a user does not need to perform an inconvenient manipulation, such as movement of the digital camera 100, in order to move the subject to be photographed to the designated view area. For example, when the user performs self photography, photographing is performed so that his or her face is located on a designated view area, and, in particular, a synthesized image may be displayed on a front display or a flipped display screen to enable the user to verify the synthesized image in advance before taking a picture.

When it is determined in operation 714 that a photographing signal is input, the synthesized image is stored and recorded, in operation 716.

FIG. 8 is a flowchart of a method of controlling a digital photographing apparatus, according to another embodiment of the invention. A description of a part of FIG. 8 is similar to that of FIG. 7 and thus is omitted, and only differences between the methods of FIGS. 7 and 8 are described.

In operation 800, a template image is selected. In operation 802, a live view image is input. FIG. 8 is different from FIG. 7 in that a view area is not designated previously by a user.

In operation 804, the DSP 200 detects a subject from the live view image. When the subject is detected, the DSP 200 sets a view area at the location of the detected subject, in operation 806. In contrast with the embodiment of FIG. 7, when the subject is detected from the live view image, the view area is set on the area of the detected subject. The view area set by the DSP 200 may have a pre-defined size or shape, or a size or shape preset by the user.

In operation 808, the DSP 200 synthesizes a subject image with the template image. The image synthesis is similar as described with reference to FIG. 7.

In operation 810, the DSP 200 produces and displays a synthesized image.

When it is determined in operation 812 that a photographing signal is input, the synthesized image is stored and recorded, in operation 814. Accordingly, a synthesis area is automatically set based on subject detection information even when the synthesis area is not set. Thus, troublesome user manipulations regarding adjustment of the position and size of the synthesis area are not needed, leading to an increase in user convenience.

In a digital photographing apparatus and a method of controlling the digital photographing apparatus, according to embodiments of the invention, photography may be performed while moving a view area freely without limiting the view area to a photographing area during synthesis photography, and photography may be performed by automatically changing a synthesis location even when a subject moves.

In addition, when a synthesis area is set, synthesis may be performed without special camera movement by the user. Since a synthesis area is automatically set based on subject detection information when the synthesis area is not set, troublesome user manipulations regarding adjustment of the position and size of the synthesis area are not needed, leading to an increase in user convenience.

In particular, when self photography is performed, a synthesis area cannot be recognized, but the self photography is performed while the synthesis area is moving according to a movement of a subject, and a user is able to see an image to be currently captured on a front display or a flipped display screen. Therefore, a photographing effect may be increased.

The invention provides a digital photographing apparatus for performing photography while moving a view area freely without limiting the view area to a photographing area during synthesis photography, and a method of controlling the digital photographing apparatus.

Embodiments include computer readable medium storing a program for causing a computer to perform operations including the steps of the method as described in at least FIGS. 7 and 8 and as described herein.

The digital photographing apparatus described herein may comprise a processor, a memory for storing program data and executing it, a permanent storage such as a disk drive, a communications port for handling communications with external devices, and user interface devices, including a display, keys, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, components, and/or groups thereof, but do not preclude the presence or addition of one or more other features, regions, integers, steps, operations, elements, components, and/or groups thereof.

For the purposes of promoting an understanding of the principles of the invention, reference has been made to example embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital photographing apparatus including a display, the method comprising:
   selecting a template image and displaying the template image on the display in a stationary manner;
   receiving an image, which is separate from the template image, including a subject and detecting the subject from the received image; and
   superimposedly displaying an image of the subject within a view area designated on the template image,
   wherein the designated view area is movable according to a movement of the detected subject.

2. The method of claim 1, wherein displaying comprises: displaying the template image with an image of the subject included in a view area corresponding to a location of the detected subject.

3. The method of claim 1, further comprising designating a location of the view area on the template image.

4. The method of claim 1, wherein a location of the view area is set on the location of the detected subject.

5. The method of claim 1, further comprising:
   setting the view area corresponding to the location of the detected subject;
   generating a mask template image by removing the view image from the input image; and
   storing the mask template image.

6. The method of claim 5, wherein the generating of the mask template image further comprises blurring a boundary of the view area.

7. The method of claim 5, wherein the storing of the mask template image comprises storing information about a starting coordinate of a minimum rectangle surrounding the view area and information about a size of the minimum rectangle.

8. The method of claim 5, wherein the displaying comprises displaying a synthesized image obtained by synthesizing the stored mask template image and the template image.

9. The method of claim 1, wherein the digital photographing apparatus comprises a front display screen or a flipped display screen.

10. The method of claim 1, further comprising: in response to receiving a shutter release signal, capturing the input image and synthesizing the captured input image with the template image.

11. The method of claim 1, wherein the subject comprises a face area of a person.

12. The method of claim 1, wherein the template image is a background image.

13. The method of claim 1, wherein the input image is a live view image.

14. A method of controlling a digital photographing apparatus including a display, the method comprising:
   selecting a template image and displaying the template image on the display in a stationary manner;
   receiving an image, which is separate from the template image, including a subject and detecting the subject from the received image;
   capturing the input image comprising a view area corresponding to a location of the detected subject; and
   synthesizing the template image with the captured input image such that an image of the subject is superimposedly displayed within the view area designated on the template image,
   wherein the designated view area is movable according to a movement of the detected subject.

15. The method of claim 14, wherein the view area is movable on the template image according to a movement of the subject.

16. The method of claim 14, further comprising setting the view area onto the location of the detected subject,
   wherein the set view area is movable according to a movement of the subject.

17. A digital photographing apparatus, the digital photographing apparatus comprising:
   a display;
   a subject detection unit configured to receive an image comprising a subject and configured to detect the subject from the received image; and
   a controller configured to receive a template image, which is separate from the image comprising the subject, and configured to display the template image on the display in a stationary manner with an image of the subject superimposedly within a view area corresponding to a location of the detected subject, wherein the view area including the subject is designated on the template image and the designated view area is movable according to a movement of the detected subject.

18. The digital photographing apparatus of claim 17, wherein the controller comprises a view area moving unit configured to move the view area designated on the template image according to a movement of the detected subject.

19. The digital photographing apparatus of claim 17, wherein the controller further comprises a view area matching unit configured to set the view area onto the location of the detected subject.

20. The digital photographing apparatus of claim 17, wherein the controller further comprises an image synthesis unit configured to synthesize the image of the subject included in the view area corresponding to the location of the detected subject with the template image.

21. The digital photographing apparatus of claim 17, wherein the controller further comprises an area effect-giving unit configured to blur a boundary of the view area.

22. The digital photographing apparatus of claim 17, further comprising a front display screen or a flipped display screen configured to display the image of the subject and the template image so that the image of the subject and the template image face the subject.

* * * * *